United States Patent
Pugh

(10) Patent No.: US 7,325,755 B2
(45) Date of Patent: Feb. 5, 2008

(54) ROTARY TOOL FOR SPREADING PARTICULATE MATERIALS AND METHOD OF USING THE SAME

(75) Inventor: Todd E. Pugh, Louisville, OH (US)

(73) Assignee: Green Industry Innovators, L.L.C., Louisville, OH (US)

( * ) Notice: Subject to any disclaimer, the term of this patent is extended or adjusted under 35 U.S.C. 154(b) by 333 days.

(21) Appl. No.: 10/933,142

(22) Filed: Sep. 2, 2004

(65) Prior Publication Data

US 2006/0043221 A1    Mar. 2, 2006

(51) Int. Cl.
*A01C 15/00* (2006.01)

(52) U.S. Cl. .................. 239/650; 239/663; 239/289; 37/244; 56/17.5

(58) Field of Classification Search .......... 239/650, 239/289; 37/259, 244, 223, 238, 403; 30/246; 404/112, 113, 97, 101; 172/13, 14, 21, 25; 56/17.5; 460/111
See application file for complete search history.

(56) References Cited

U.S. PATENT DOCUMENTS

| | | | | |
|---|---|---|---|---|
| 1,692,617 A | * | 11/1928 | Bowen | 239/223 |
| 3,208,209 A | * | 9/1965 | Dunlap et al. | 56/295 |
| 3,638,917 A | * | 2/1972 | Osten | 366/149 |
| 4,054,992 A | * | 10/1977 | Ballas et al. | 30/276 |
| 4,190,954 A | * | 3/1980 | Walto | 30/347 |
| 4,404,706 A | * | 9/1983 | Loyd | 15/344 |
| 4,911,247 A | * | 3/1990 | Kuhlmann et al. | 172/41 |
| 4,928,457 A | * | 5/1990 | Laperle | 56/12.7 |
| 4,936,884 A | * | 6/1990 | Campbell | 56/12.7 |
| 5,340,030 A | * | 8/1994 | Siegrist, Jr. | 239/289 |
| 5,522,162 A | * | 6/1996 | Allison | 37/242 |
| 5,890,352 A | * | 4/1999 | Molina | 56/12.7 |
| 6,536,535 B1 | | 3/2003 | Washek | |
| 6,631,770 B2 | | 10/2003 | Guard et al. | |

* cited by examiner

*Primary Examiner*—Dinh Q. Nguyen
(74) *Attorney, Agent, or Firm*—Sand & Sebolt

(57) ABSTRACT

The rotary tool for spreading particulate materials from a mound of the same. The tool has an elongated shaft with a rotatable body mounted proximate a first end thereof. The body has a peripheral edge with a plurality of flexible fingers radiating outwardly therefrom. The rotatable body has an upper surface and a center axis in the upper surface. The tool includes a motor which, when activated, causes the rotatable body to rotate about its center axis. As the rotatable body rotates, the fingers engage the particulate materials and cause the pieces to be flicked outwardly away from the rotating body. The tool may also be used as a shovel-type device when the motor is not activated.

18 Claims, 11 Drawing Sheets

ROTARY TOOL FOR SPREADING PARTICULATE MATERIALS AND METHOD OF USING THE SAME

BACKGROUND OF THE INVENTION

1. Technical Field

This invention generally relates to rotary tools. More particularly, the invention relates to a rotary tool for spreading particulate materials. Specifically, the invention relates to a rotary tool which includes a rotatable body with a plurality of fingers radiating outwardly therefrom.

2. Background Information

In landscaping, it is common to apply particulate materials such as mulch to flowerbeds to reduce weed growth, retain moisture in the soil and improve the aesthetic appearance of the flowerbed. Commonly used mulch particulate materials include leaves, bark chips and shredded wood. These materials are usually delivered by wheelbarrow or bag to the flowerbed and the gardener then spreads the particulate materials around the plants using a rake. Spreading and leveling a particulate materials mound is both time consuming and laborious because of the physical nature of these types of materials and their tendency to stick together in clumps. This is especially true for employees of landscaping services who may have to particulate materials a large number of flowerbeds for numerous clients in a fairly short time span. It is also possible that a gardener will wish to distribute other types of particulate materials, such as gravel or stones, over the ground surface within a flower bed. These particulate materials are equally difficult to distribute over the surface.

There is therefore a need in the art for a device that assists the gardener to spread particulate materials, such as mulch, gravel or stone, around a flowerbed and which particularly assists in distributing the particulate materials from an initially formed mound of the same.

SUMMARY OF THE INVENTION

The rotary tool of the present invention includes a rotatable body that has an upper surface and a center axis therein. A stationary coupler is coaxial with the center axis of the rotatable body and receives a powered drive shaft therein. When the drive shaft is activated it causes the rotatable body to rotate about the center axis. The rotatable body also include a peripheral edge for engaging the particulate materials. The peripheral edge may include a plurality of fingers that extend outwardly therefrom. The rotary tool may be rotated in a clockwise or anti-clockwise direction, or the rotation may be of an oscillating nature where the rotatable body alternates between a clockwise and anti-clockwise direction. As the rotatable body rotates, the fingers engage the particulate material and cause individual particulate materials to be flicked outwardly away from the rotating body.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

DETAILED DESCRIPTION OF THE INVENTION

Figure 1:
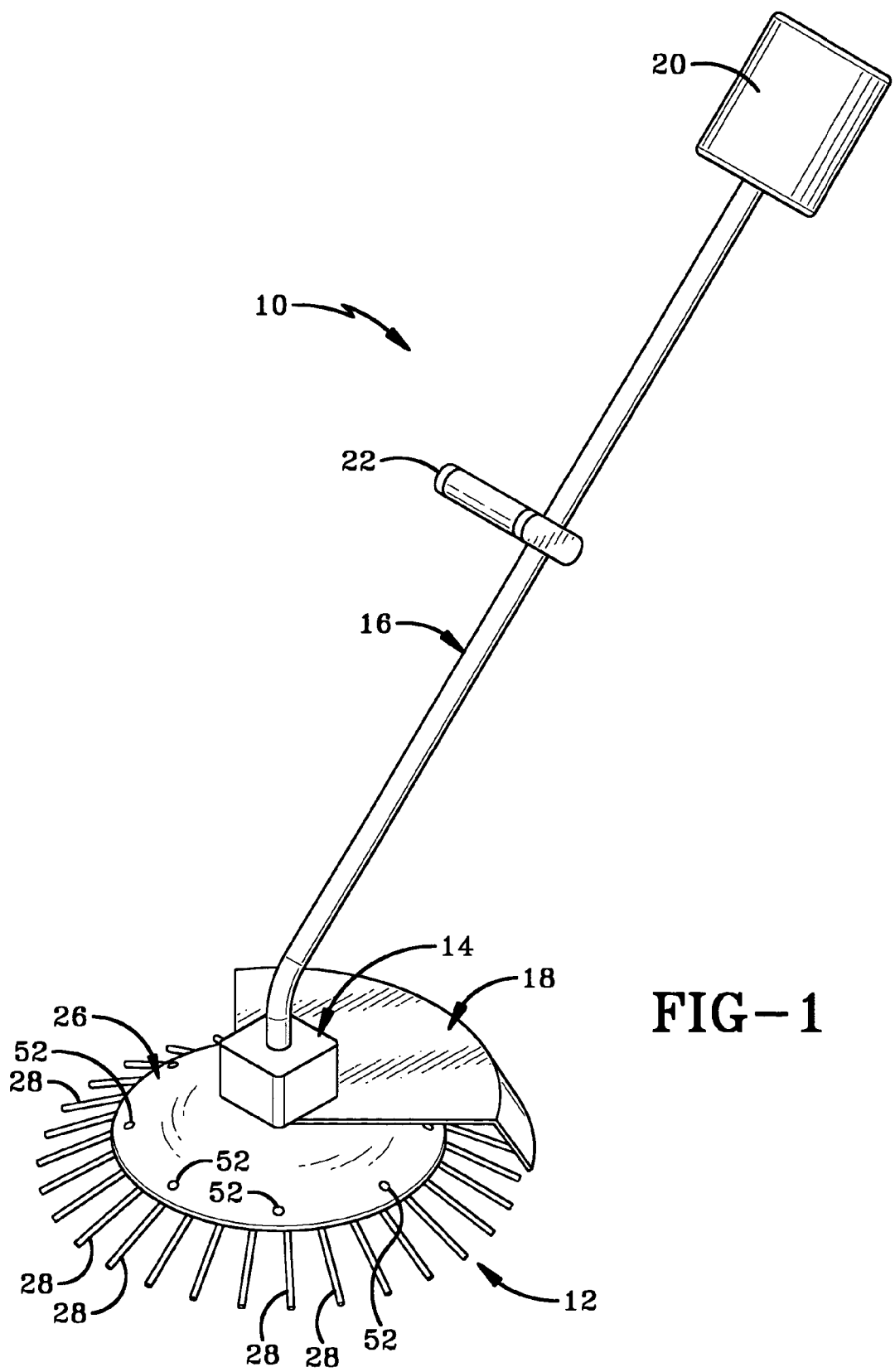
FIG. 1 is a perspective view of a rotary tool in accordance with the present invention.

Referring to FIG. 1, there is shown a rotary tool in accordance with the present invention and generally indicated at 10. Tool 10 includes a rotatable body or spreader, generally indicated at 12, mounted via a stationary coupler 14 to one end of a shaft 16. Rotatable body 12 is partially covered by a hood 18 to protect the operator from flying debris. A motor 20 is mounted on the other end of shaft 16 and a handle 22 is provided for holding tool 10.

Figure 2:
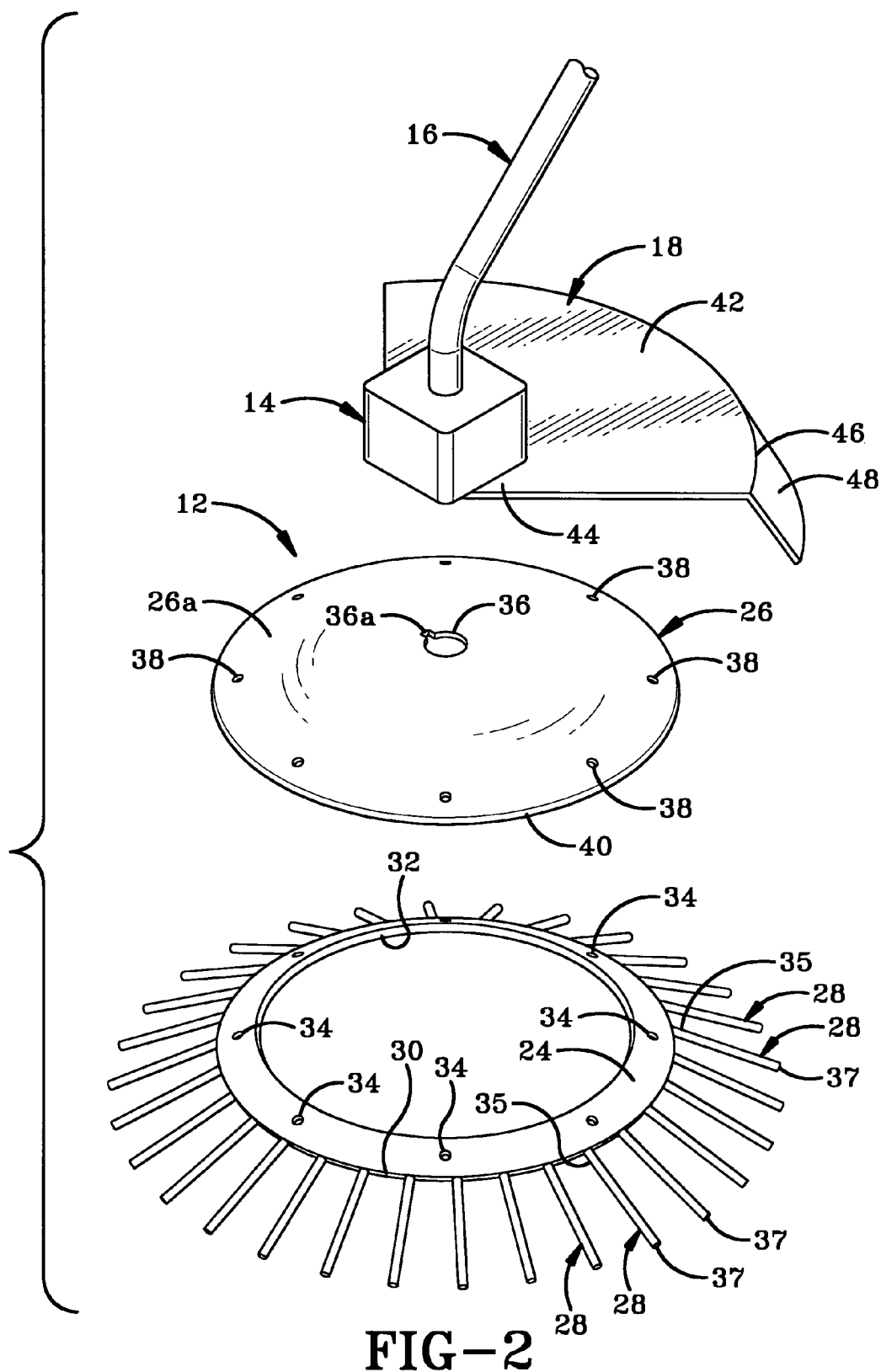
FIG. 2 is a partial exploded view of the rotatable body end of the rotary tool.
Figure 3:
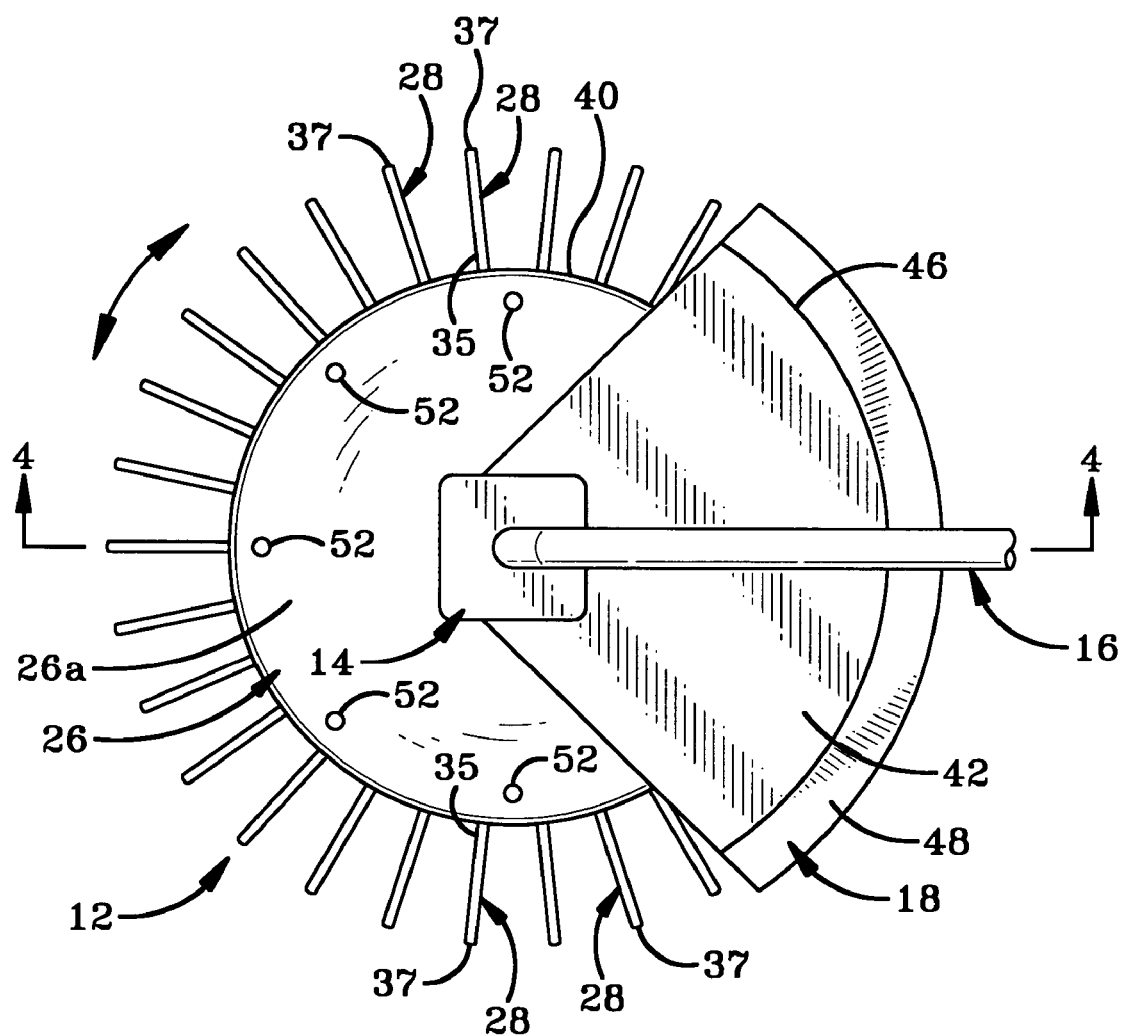
FIG. 3 is a top view of the rotary tool in which it is shown that the rotatable body can rotate in two opposing directions.
Figure 4:
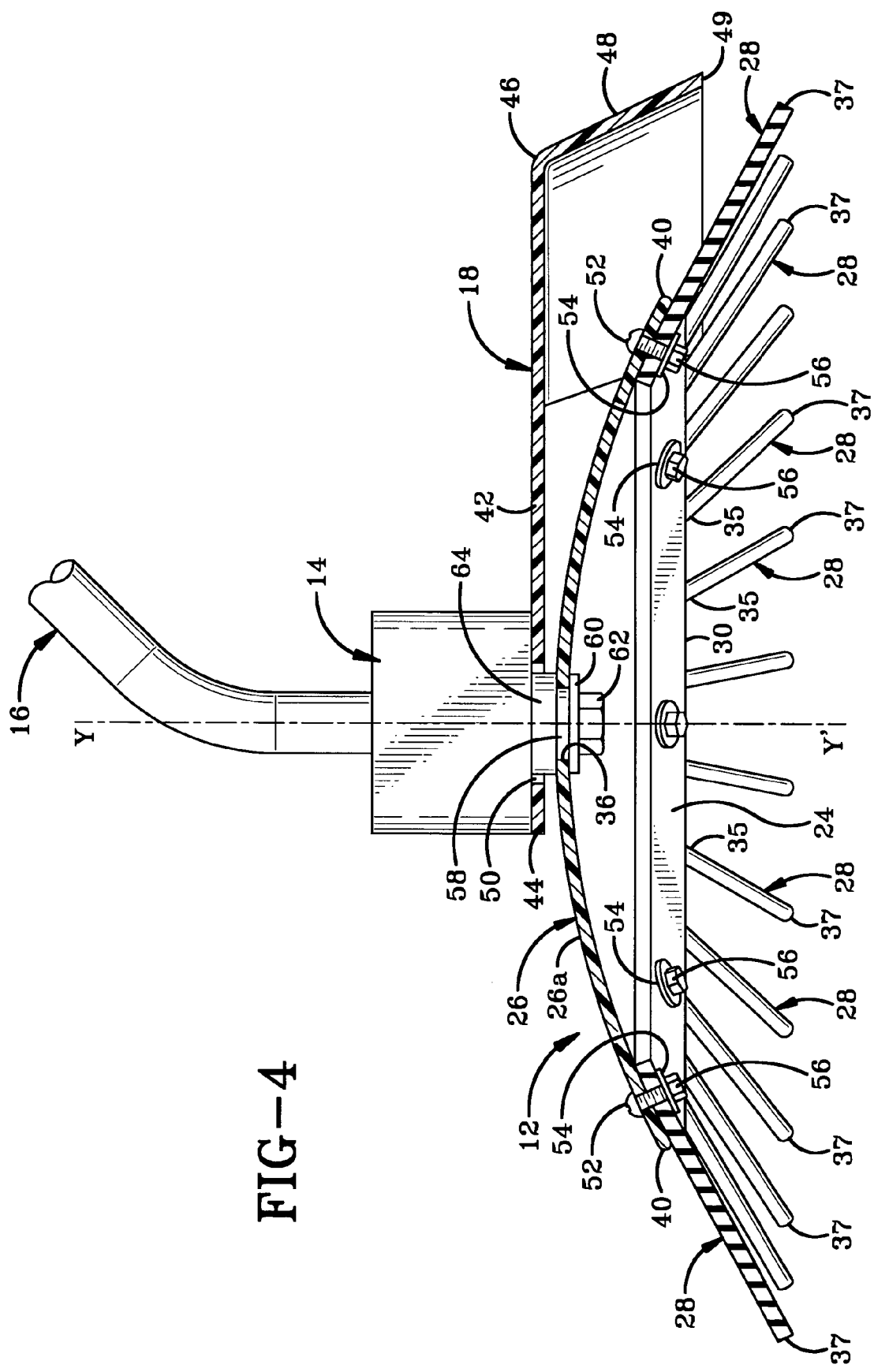
FIG. 4 is a partial cross-sectional side elevational view of the rotary tool through line 4-4—of FIG. 3.

Referring to FIGS. 2-4, a first embodiment of rotatable body 12 comprises a ring 24 and a plate 26 that are connected to stationary coupler 14. Ring 24 has a plurality of flexible fingers 28 radiating outwardly from its peripheral edge 30 and has a centrally located hole 32. Fingers 28 have first ends 35 and second ends 37. First ends 35 of fingers 28 are connected to ring 24 and second ends 37 are coplanar. The second ends 37 of fingers 28 preferably lie two to three inches outwardly from peripheral edge 30. Ring 24 preferably is manufactured from a plastic or rubber that is sufficiently rigid to move the particulate materials but is flexible enough that fingers 28 can bend slightly upon entering the particulate materials and spring back to their original position, thereby flicking particulate materials away from tool 10. A plurality of apertures 34 are provided at intervals around ring 24.

Plate 26 preferably is manufactured from a more rigid plastic or rubber than is ring 24 but is still preferably slightly flexible. Plate 26 is slightly convex in shape (FIG. 4) and has a central aperture 36 therein. Central aperture 36 may be slotted as at 36a to ensure correct alignment of a drive shaft therein as hereinafter described. A plurality of apertures 38 are provided at intervals proximate the outer edge 40 of plate 26 and are positioned and spaced to align with apertures 34 on ring 24. As may be seen from FIG. 4, rotatable body 12 is arcuate and has a center axis Y-Y'. Stationary coupler 14 is coaxial with center axis Y-Y' and is disposed on upper surface 26a of plate 26. The diameter of ring 24 is substantially the same as the diameter of plate 26 so that outer edge 40 of plate is substantially vertically aligned with the peripheral edge 30 of ring 24. Furthermore fingers 28 radiate outwardly from arcuate plate 26 at substantially the same rate of curvature as that of plate 26.

Hood 18 is provided to partially cover ring 24 and plate 26 when rotatable body 12 is assembled. Hood 18 comprises a substantially triangular-shaped body 42 having an apex 44 and an arcuate outer edge 46. A skirt 48 extends downwardly from outer edge 46. Body 42 and skirt 48 preferably are integrally formed. Body 42 is provided with an aperture 50 proximate apex 44 through which a drive shaft 16 extends as hereinafter described.

Rotatable body 12 is assembled in the following manner. Plate 26 and ring 24 are connected together by bolts 52 inserted through aligned apertures 34, 38 in ring 24 and plate 26, respectively. Bolts 52 are secured in place with washers 54 and nuts 56. A drive shaft 58 extending outwardly from stationary coupler 14 is inserted through aperture 50 in hood 18, through aperture 36 in plate 26 and is secured in place by a washer 60 and nut 62. Drive shaft 58 is partially surrounded by a bushing 64 to prevent the rotational motion of shaft 58 from being transferred to hood 18. When rotatable body 12 is assembled, it can be seen that the outer edge 40 of plate 26 is substantially vertically aligned with the peripheral edge 30 of ring 24 (FIG. 4). Furthermore, the bottom edge 49 of skirt 48 extends below the outer edge 40 of plate 26 and edge 32 of ring 24. Furthermore, bottom edge 49 of hood 18 is positioned so that the second ends 37 of fingers 28 lie under hood 18.

Figure 5:
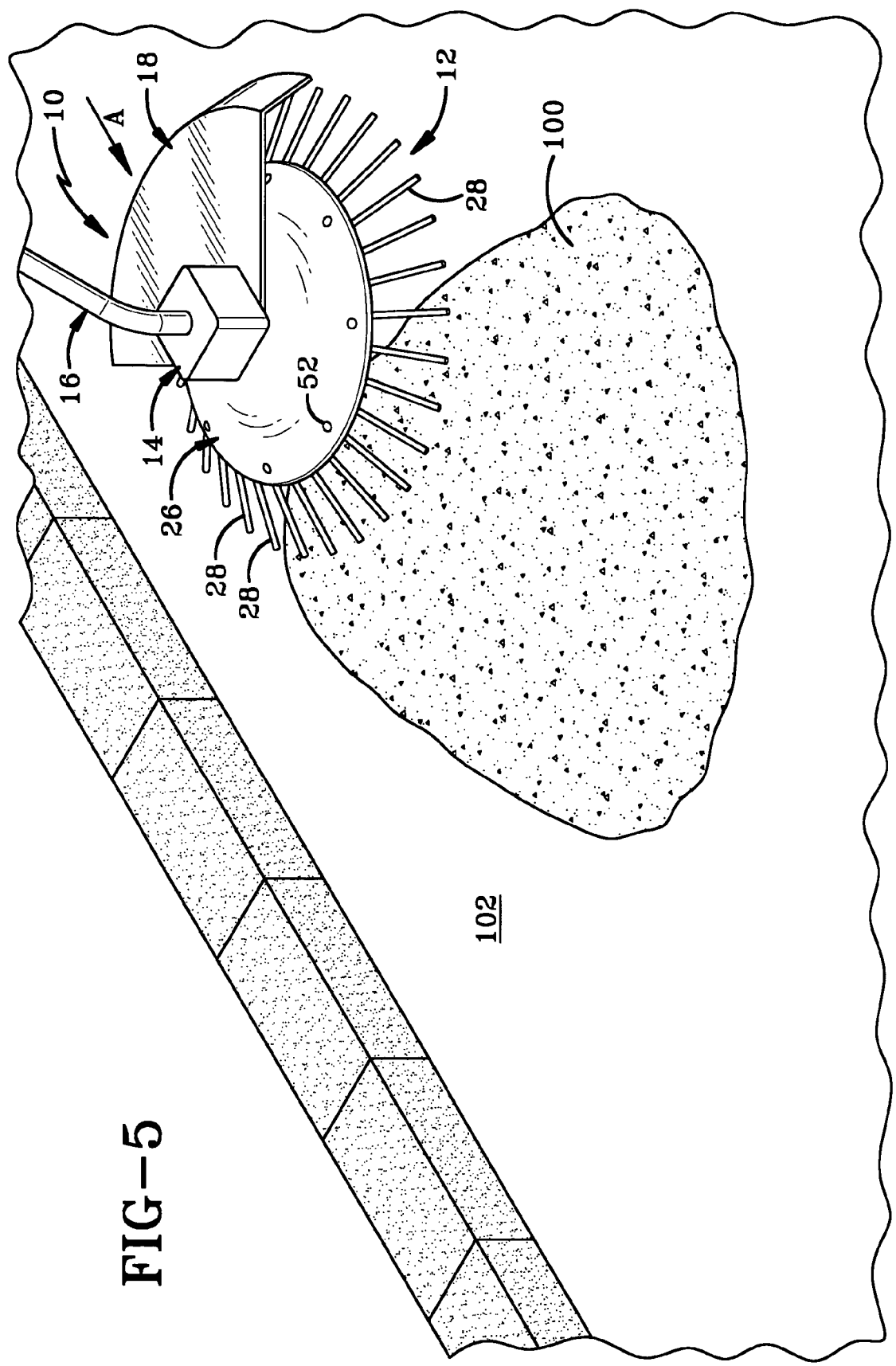
FIG. 5 is a perspective view of the rotary tool being brought into contact with a mound of particulate materials.
Figure 6:
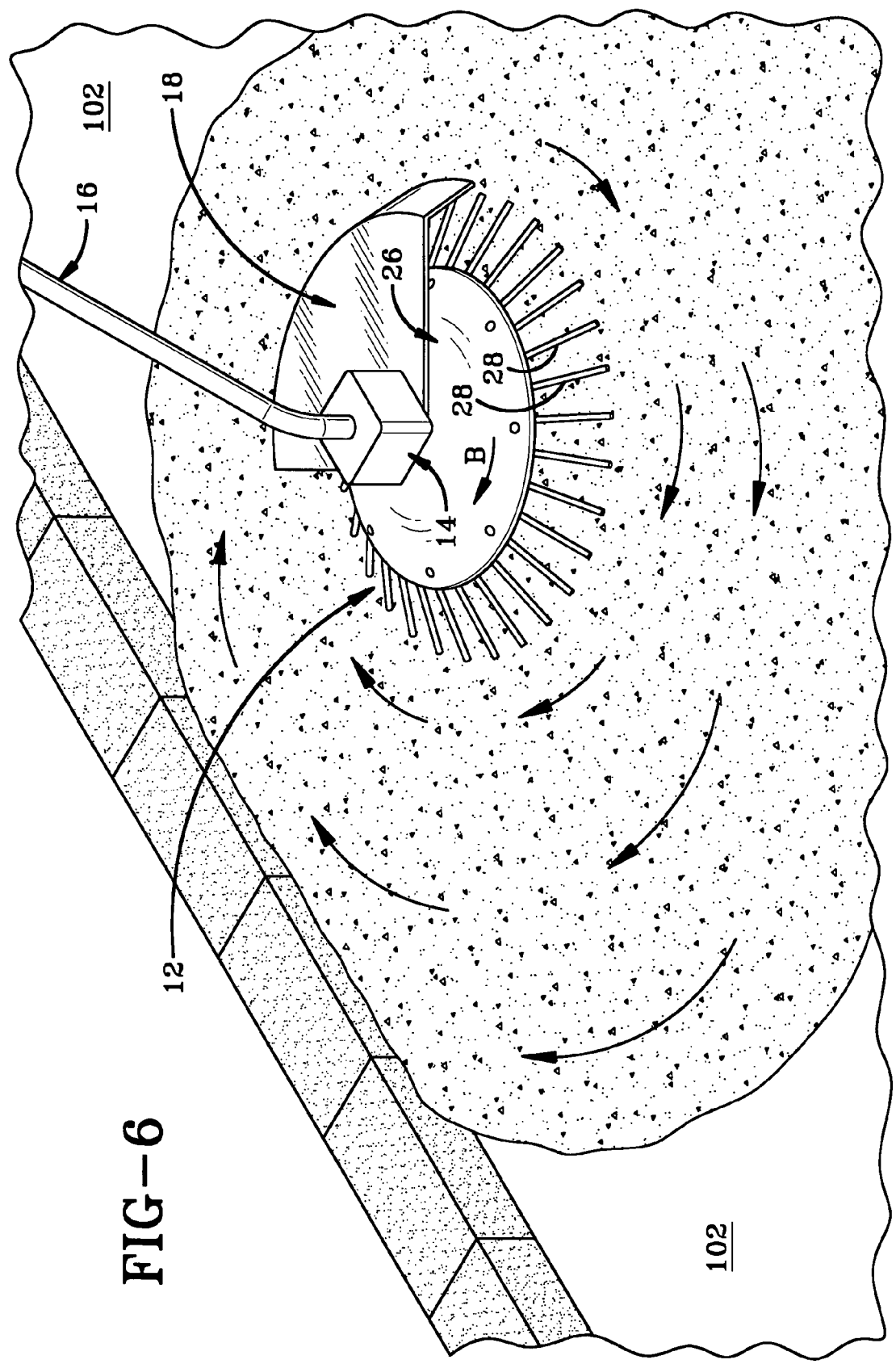
FIG. 6 is a perspective view of the rotary tool spreading a mound of particulate materials.

Referring to FIGS. 5-6, rotary tool 10 is used in the following manner. Tool 10 is moved in the direction of the arrow "A" toward a mound 100 of particulate materials piled on the flowerbed ground surface 102. Tool 10 is positioned above mound 100 and is activated so that rotatable body 12 rotates as indicated by arrow "B" (FIG. 6). Tool 10 is moved vertically downwardly into mound 100 and as fingers 28 contact the particulate materials, small pieces of material are flung radially outwardly from rotatable body 12. This causes the materials in mound 100 to be redistributed over a wider area of the ground surface 102.18. Drive shaft 58 rotates plate 26 and consequently ring 24. Rotatable body 12 may be wired to cause drive shaft 58 to rotate plate 26 and ring 24 in either a clockwise or anti-clockwise direction or to oscillate between the two directions. Furthermore, once the initial mound 100 of particulate materials has been partially spread by the rotating body 12, the rotating body 12 may be moved laterally across ground surface 102 to further distribute the particulate material. This lateral motion may alternatively be undertaken prior to moving tool 10 vertically downwardly into mound 100. When the desired spread and thickness of particulate material has been achieved, motor 20 is switch off and the rotation of rotatable body 12 ceases.

Figure 7:
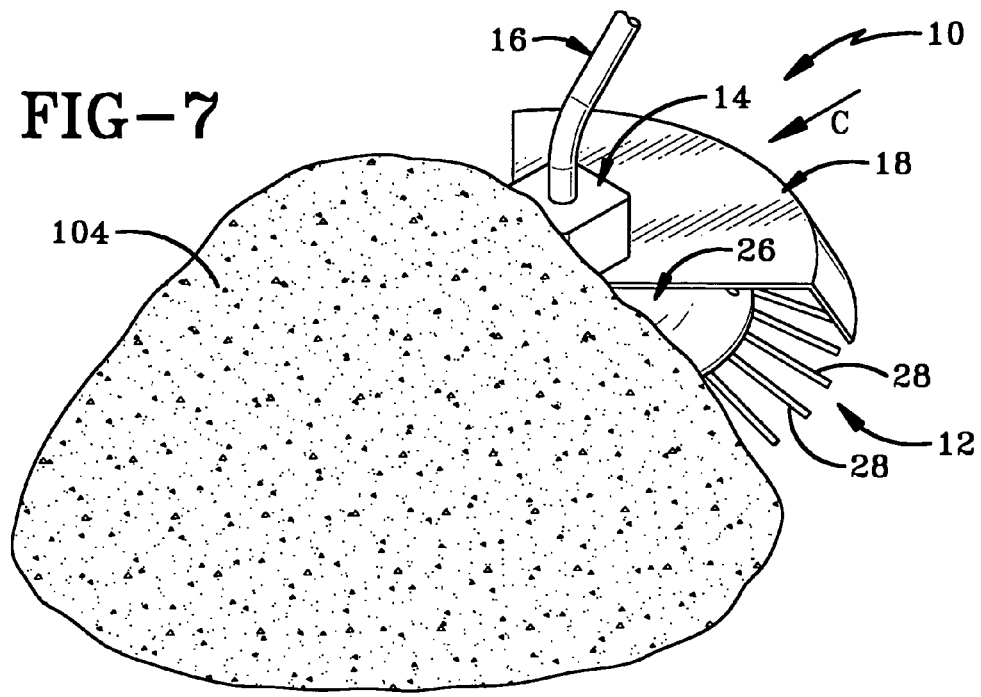
FIG. 7 is a perspective view of the rotary tool being brought into contact with a mound of particulate materials
Figure 8:
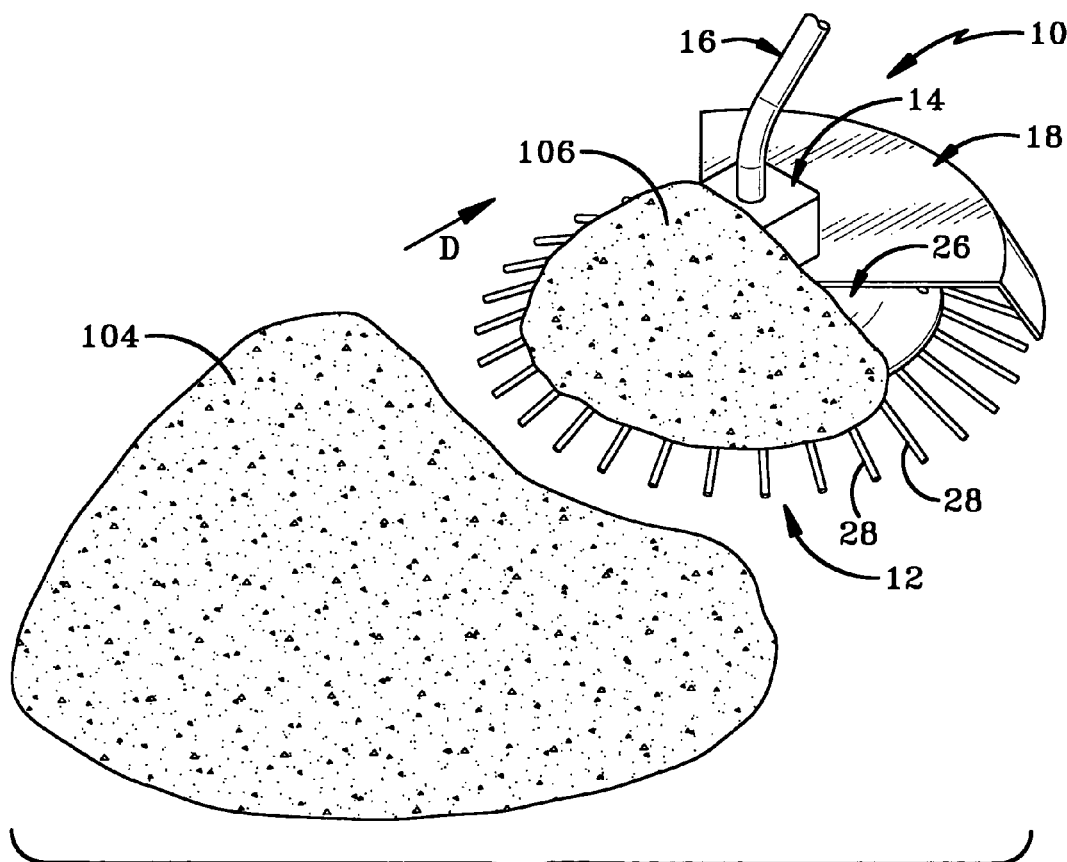
FIG. 8 is a perspective view of the rotary tool being used as a shovel to remove a portion of a mound of particulate materials.

Referring to FIGS. 7-8, rotary tool 10 may also be used to move particulate materials in the following manner. Tool 10 is moved in the direction of arrow "C" toward another mound 104 of particulate materials. Tool 10 is not activated and, consequently, there is no rotational motion of fingers 28. Tool 10 is moved in the direction of arrow "C" until a small pile 106 of particulate materials accumulates onto plate 26. Tool 10 is then withdrawn from mound 104 in the direction of arrow "D" and pile 106 of particulate materials may be carried on tool 10 over the ground surface to a remote location. When the desired remote location is reached, tool 10 is tilted so that pile 106 slides off from plate 26.

Figure 9:
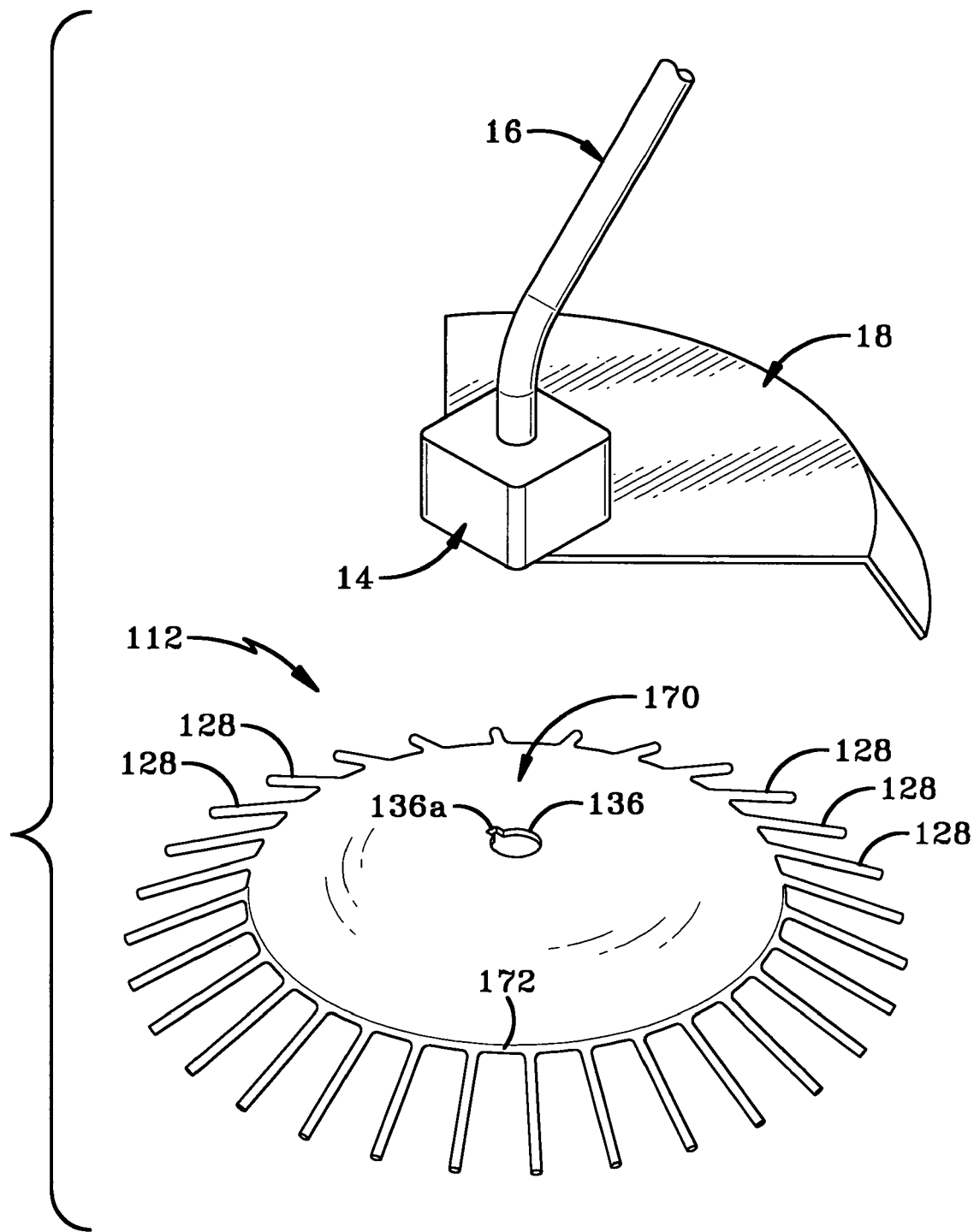
FIG. 9 is a partial exploded view of a second embodiment of the rotary tool.
Figure 10:
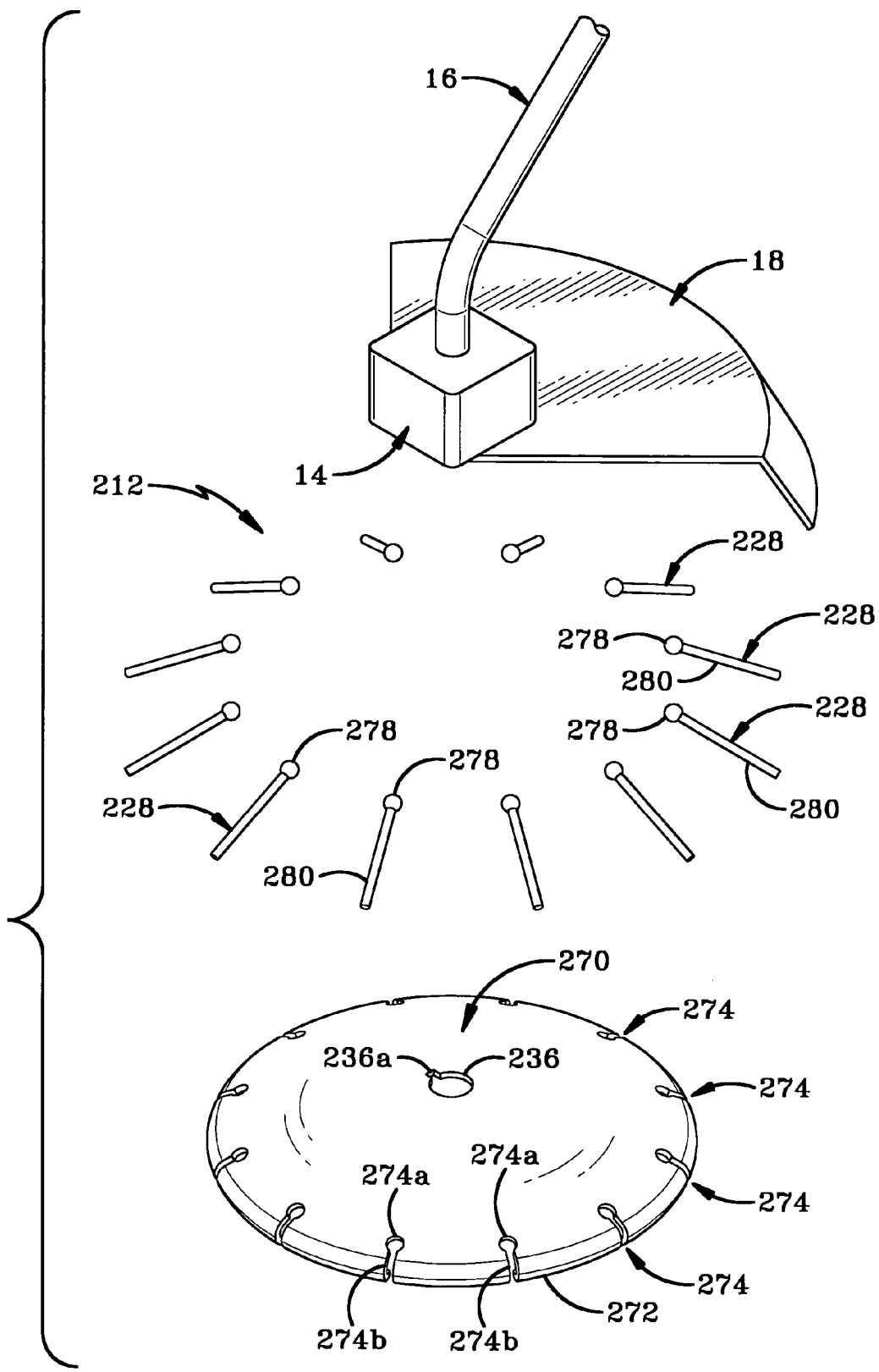
FIG. 10 is a partial exploded view of a third embodiment of the rotary tool.
Figure 11:
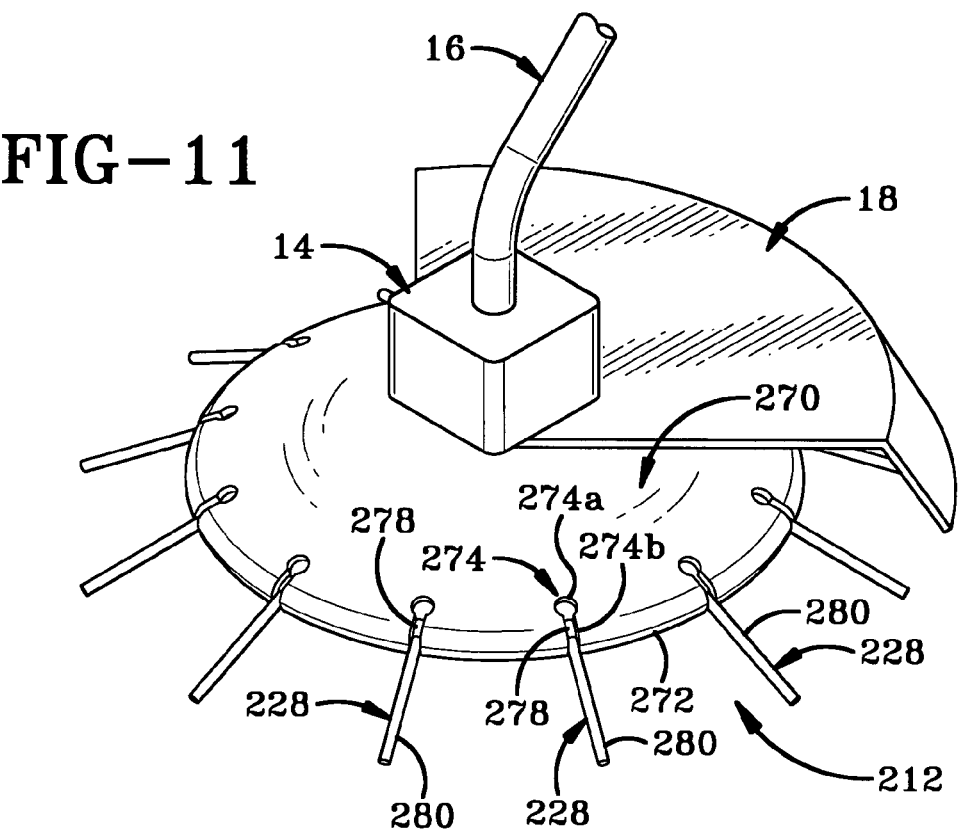
FIG. 11 is a partial perspective view of the third embodiment of the rotary tool.
Figure 12:
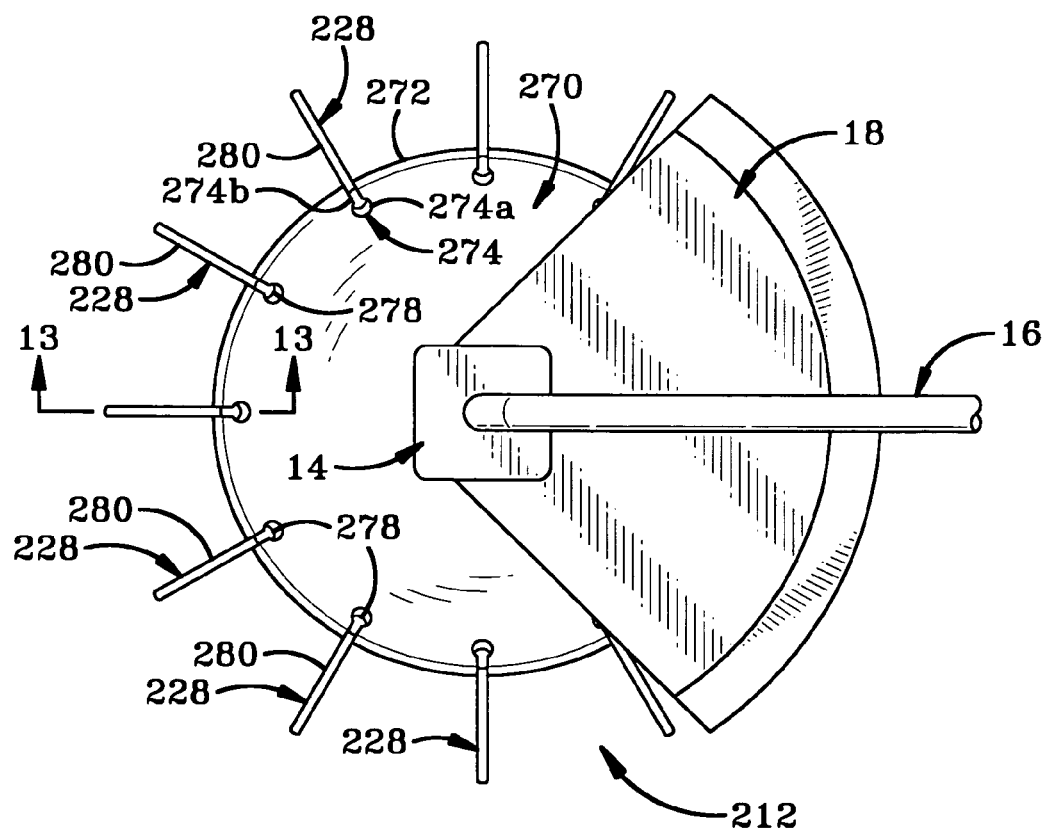
FIG. 12 is a top view of the rotary tool of FIG. 11.
Figure 13:
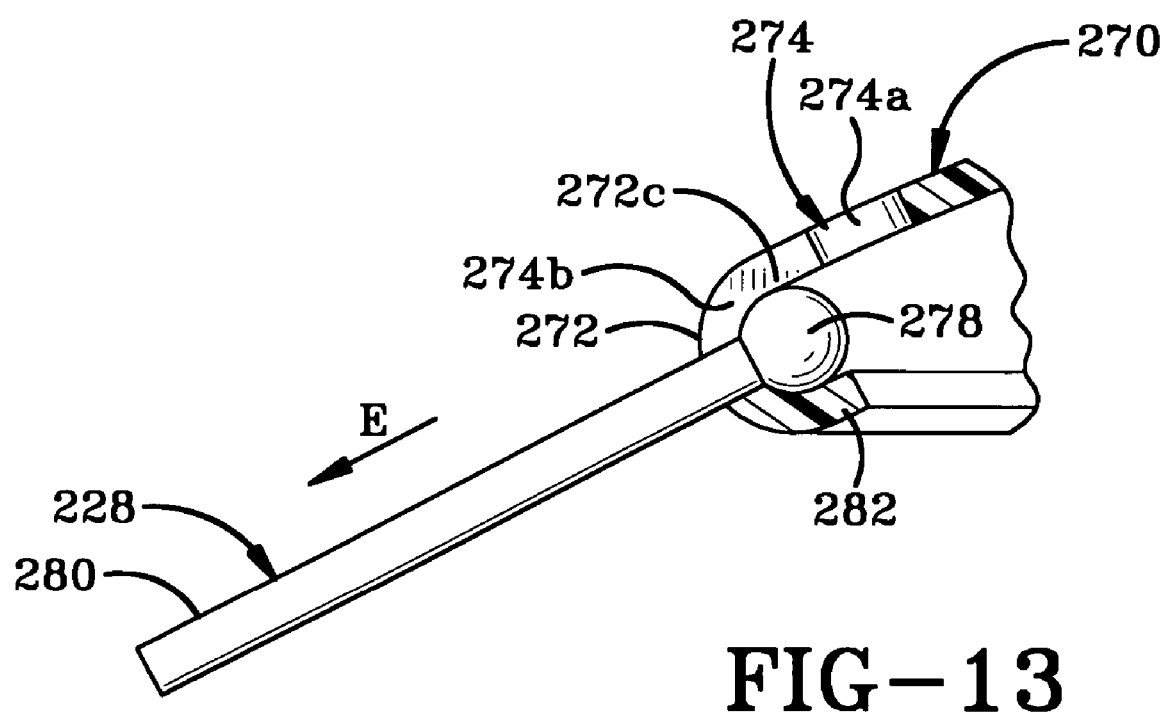
FIG. 13 is a partial cross-sectional side view of a finger of the rotary tool taken through line 13-13 of FIG. 12.

Referring to FIG. 9, there is shown a second embodiment of the rotatable body for use in association with tool 10, and generally indicated at 112. Rotatable body 112 comprises a rotatable body 170 having a convex cross-section and a centrally located aperture 136. Aperture 136 may include a slotted area 136*a* for correct alignment of a drive shaft (not shown) housed within stationary coupler 14 of tool 10. A plurality of fingers 128 radiate outwardly from the outer edge 172 of rotatable body 170. Rotatable body 170 preferably is manufactured from a rubber or plastic material that is strong enough to support a small amount of particulate materials thereon, but which allows fingers 128 to be flexible. Rotatable body 170 is connected to the drive shaft (not shown) extending outwardly from stationary coupler 14, through an aperture (not shown) in hood 18 and is secured thereto by a nut (not shown) as described with reference to rotatable body 12. Rotatable body 112 is used in the same manner described with reference to rotatable body 12.

Referring to FIGS. 10-13, there is shown a third embodiment of a rotatable body in accordance with the present invention and generally indicated at 212. Rotatable body 212 comprises a convexly domed rotatable body 270 having a central aperture 236 therein. Aperture 236 may be slotted as at 236*a* to receive a drive shaft (not shown) therethrough. A plurality of keyhole-shaped slots 274 are formed in rotatable body 270 proximate the outer edge 272 thereof. A plurality of fingers 228 are provided for insertion into slots 274. Each finger 228 has a bulbous head 278 and an elongated shaft 280. Head 278 of each finger 228 is received in the wider portion 274*a* of one of slots 274 and a section of shaft 280 is received in the narrow portion 274*b* of the same slot 274. When head 278 of a finger 228 is inserted into wider portion 274*a* of one of slots 274, it is pulled radially outwardly away from the center axis of rotatable body 270 as shown by arrow "E" (FIG. 13) and locks into a curved seat 282 formed in outer edge 272 of rotatable body 270. Shaft 280 extends outwardly from rotatable body 270 through narrower portion 274*b* of slot 274. In this position, head 280 is wedged beneath a section 272*c* of outer edge 272 which lies between wider portion 274*a* of slot and seat 282. Section 272*c* substantially prevents finger 228 from popping out of slot 274 when rotatable body 212 is used. Rotatable body 212 is connected to stationary coupler 14 and hood 18 in the same manner as described with reference to the previous embodiments and rotatable body 212 is used in the same manner as described with reference to the previous embodiments. The configuration of rotatable body 212 allows individual fingers to be replaced if they are damaged by simply removing the damaged component and replacing it with an undamaged component.

While it has been disclosed that ring 24, plate 26 and rotatable bodies 170 and 270 are manufactured from rubber or plastic, it will be understood that these components could be manufactured from a suitable metal or composite material, without departing from the spirit of the present invention. Furthermore, while plate 26, rotatable body 170 and rotatable body 270 have been shown and described as being convex in cross-section, it will be understood that the plate or rotatable body could be substantially flat or concave in cross-section, without departing from the spirit of the present invention. Furthermore, while the rotatable bodies 170 and 270 and plate 26 have been shown and described as being generally circular in shape, these components could be formed in other shapes, such as an ellipse or triangle, without departing from the spirit of the present invention. Additionally, the rotatable body could be mounted on the end of a weed trimmer or other type of presently known tool.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A rotary tool for spreading particulate material; the tool comprising:
   a rotatable body having a center axis, an upper surface and a peripheral edge adapted to engage the particulate material; whereby the peripheral edge of the body is rotatable about the center axis,
   a stationary coupler on the upper surface of the body and adapted to receive a powered drive shaft; said stationary coupler being substantially coaxial with the center axis of the body;
   a substantially circular ring having a diameter substantially equal to the diameter of the body; wherein the body and ring each define a plurality of holes therein; and the holes formed in the body align with the holes formed in the ring when the ring is positioned along the peripheral edge of the body;
   at least one attachment device for connecting the ring to the body; and the attachment device includes a plurality of fasteners extending through the aligned holes; and
   a plurality of fingers extending outwardly from the ring.

2. The rotary tool as defined in claim 1, wherein the body is substantially circular and non-cylindrical in shape.

3. The rotary tool as defined in claim 2, wherein the rotatable body is substantially convex in cross-section.

4. The rotary tool as defined in claim 1, wherein each of the plurality of fingers has a first end attached to the ring and a second end extending outwardly away from the ring and the second ends of the plurality of fingers are substantially coplanar.

5. The rotary tool as defined in claim 1, wherein one or more of the body, ring and fingers are manufactured from one of the group consisting of rubber, plastic, metal and composite materials.

6. The rotary tool as defined in claim 1, wherein the fingers are integrally formed with the rotatable body.

7. The rotary tool as defined in claim 1, wherein the fingers are individually connectable to the rotatable body.

8. The rotary tool as defined in claim 1, further comprising:
   an elongated drive shaft having a first end and a second end; and
   a motor, and wherein the rotatable body is mounted through the coupler to the a first end of the drive shaft and is operationally connected thereby to the motor.

9. The rotary tool as defined in claim 1, further comprising a weed trimmer of the type having an elongated drive shaft; and in wherein the rotatable body is mounted to the weed trimmer drive shaft by way of the coupler.

10. The rotary tool as defined in claim 1, further comprising a cover that extends around at least a portion of the rotatable body; and wherein the plurality of fingers extend outwardly from under the cover.

11. The rotary tool as defined in claim 1, wherein the fingers extend downwardly away from the body.

12. A rotary tool for spreading particulate material; the tool comprising:
   a rotatable body having a center axis and an upper surface;
   a peripheral edge on the rotatable body adapted for engaging the particulate material, said peripheral edge being rotatable about the center axis of the body;
   a stationary coupler on the upper surface of the body and being adapted to receive a powered drive shaft; wherein the stationary coupler is substantially coaxial with the center axis of the body;
   a plurality of fingers extending outwardly from the body; each finger being individually connectable to the body; and wherein each finger has a bulbous head with an elongated shaft extending outwardly therefrom; and
   the rotatable body is formed with a plurality of keyhole-shaped slots proximate the peripheral edge; and each finger engages in one of the slots, with the bulbous head of the finger being received in a wider portion of the slot and the elongated shaft of the finger being received within a narrower portion of the slot.

13. The rotary tool as defined in claim 12, wherein the body is substantially circular and non-cylindrical in shape.

14. The rotary tool as defined in claim 13, wherein the rotatable body is substantially convex in cross-section.

15. The rotary tool as defined in claim 12, wherein the shaft of each finger terminates in a second end remote from the head thereof; and wherein the second ends of all of the fingers are substantially coplanar.

16. The rotary tool as defined in claim 12, wherein one or both of the body and fingers are manufactured from one of the group consisting of rubber, plastic, metal and composite materials.

17. The rotary tool as defined in claim 12, further comprising a cover that extends around at least a portion of the rotatable body; and wherein the plurality of fingers extend outwardly from under the cover.

18. The rotary tool as defined in claim 12, wherein the fingers extend downwardly away from the body.

* * * * *